(12) United States Patent
Rump et al.

(10) Patent No.: US 9,616,616 B2
(45) Date of Patent: Apr. 11, 2017

(54) METHOD FOR LAMINATING A COMPONENT BY MEANS OF A LAMINATING TOOL WITH A LAMINATING ELEMENT

(71) Applicant: Faurecia Innenraum Systeme GmbH, Hagenbach (DE)

(72) Inventors: Romain Rump, Neyron (FR); Maciej Czerkas, Simpsonville, SC (US)

(73) Assignee: FAURECIA INNENRAUM SYSTEME GMBH, Hagenbach (DE)

( * ) Notice: Subject to any disclaimer, the term of this patent is extended or adjusted under 35 U.S.C. 154(b) by 201 days.

(21) Appl. No.: 14/189,409

(22) Filed: Feb. 25, 2014

(65) Prior Publication Data
US 2014/0246150 A1   Sep. 4, 2014

(30) Foreign Application Priority Data
Feb. 28, 2013  (DE) .................. 10 2013 203 408

(51) Int. Cl.
*B44C 3/12*   (2006.01)
*B29C 65/00*   (2006.01)
(Continued)

(52) U.S. Cl.
CPC .......... *B29C 63/0004* (2013.01); *B29C 63/02* (2013.01); *B29C 63/04* (2013.01);
(Continued)

(58) Field of Classification Search
CPC ............. Y10T 156/10; Y10T 156/1028; Y10T 156/108; B29C 63/02; B29C 63/04;
(Continued)

(56) References Cited

U.S. PATENT DOCUMENTS 5,326,417 A * 7/1994 Phelps .................. B29C 63/025
100/237
5,462,786 A * 10/1995 Van Ert ................... B29C 43/18
156/212

(Continued)

FOREIGN PATENT DOCUMENTS

DE       3808851 A1 *  9/1989 ............. B29C 63/02
DE       4237274 A1 *  5/1994 ......... B29C 63/0082
(Continued)

*Primary Examiner* — Philip Tucker
*Assistant Examiner* — Brian R Slawski
(74) *Attorney, Agent, or Firm* — Timothy X. Gibson, Esq.; Gibson & Dernier LLP

(57) ABSTRACT

A method for laminating a component by means of a laminating tool with a laminating element, wherein the component has a groove, wherein the component has a first surface and second surface, wherein the first surface and the second surface border on one another in the groove, wherein the method comprises the following steps:
   masking the first surface with a mask, wherein the mask has a resilient lip,
   pressing the resilient lip into the groove by means of the laminating tool, wherein the resilient lip is designed, after having being pressed into the groove, to mask within the groove a partial area of exclusively the first surface,
   laminating the second surface with the laminating element, wherein, due to the lamination, parts of the laminating element cover the mask,
   removing the parts of the laminating element which cover the mask.

13 Claims, 2 Drawing Sheets

(51) Int. Cl.
*B32B 37/00* (2006.01)
*B32B 38/04* (2006.01)
*B65C 9/26* (2006.01)
*B29C 65/28* (2006.01)
*B65B 51/06* (2006.01)
*B29C 63/00* (2006.01)
*B29C 63/02* (2006.01)
*B29C 65/78* (2006.01)
*B29C 63/04* (2006.01)
*B29L 31/30* (2006.01)

(52) U.S. Cl.
CPC ...... *B29C 65/7802* (2013.01); *B29C 65/7844* (2013.01); *B29C 66/30325* (2013.01); *B29C 66/81* (2013.01); *B29C 2063/022* (2013.01); *B29L 2031/3005* (2013.01)

(58) Field of Classification Search
CPC .......... B29C 63/0073; B29C 2063/021; B29C 2063/022; B29C 65/78; B29C 65/7802; B29C 65/7841; B29C 65/7844; B29C 66/30325; B29C 66/81; B29C 66/81453; B60R 13/02; B60R 2013/0293
USPC ..... 156/60, 63, 71, 196, 212, 213, 216, 250, 156/251, 267, 289, 293, 297, 299, 349, 156/391, 423, 443, 475, 483, 484, 486, 156/510, 515, 523
See application file for complete search history.

(56) References Cited

U.S. PATENT DOCUMENTS 5,695,865 A * 12/1997 Shimizu .................. B60R 13/02
156/244.17
5,741,386 A * 4/1998 Tomioka ............... B29C 51/087
156/212
6,171,428 B1 * 1/2001 Shon ...................... B60R 13/02
156/212

FOREIGN PATENT DOCUMENTS

| | | | |
|---|---|---|---|
| DE | 4305189 A1 * | 8/1994 | ............. B29C 63/04 |
| DE | 102005020493 A1 | 11/2006 | |
| JP | H03-087243 A * | 4/1991 | ............. B29C 51/16 |
| JP | 03241081 A * | 10/1991 | |

* cited by examiner

METHOD FOR LAMINATING A COMPONENT BY MEANS OF A LAMINATING TOOL WITH A LAMINATING ELEMENT

BACKGROUND

The invention relates to a method for laminating a component, a mask for masking a component, and a laminating tool.

The lamination of components, for example the lamination of motor vehicle interior trim parts, is generally understood to be the connection of a laminating element, such as a film, to the component to be laminated. In the laminated state, the laminating element covers the component, such that the component has a surface structure that for example looks or feels good. In order to then apply various laminating elements arranged side by side to the same component, it is known from the prior art to provide a groove in the component. Here, the contact area between the two laminating elements contacting one another is arranged in the groove. If the two laminating elements overlap in part in the groove, this means that a surface formed by the two laminating elements that is externally uniform is visible overall due to the "sinking" of the point of overlap in the groove. The contact point therefore is not visible through the groove.

For example, DE 10 2005 020 493 A1 discloses a method for producing multi-coloured plastic skins

SUMMARY OF THE INVENTION

The object of the invention is to provide an improved method for laminating a component, a mask for masking a component, and a laminating tool for laminating a component.

The objects forming the basis of the invention are achieved by the features of the one or more embodiments disclosed and/or described herein.

What is described is a method for laminating a component by means of a laminating tool with a laminating element, wherein the component has a groove, wherein the component has a first surface and a second surface, wherein the first surface and the second surface border on one another in the groove. The method comprises the following steps:
   masking the first surface with a mask, wherein the mask has a resilient lip,
   pressing the resilient lip into the groove by means of the laminating tool, wherein the resilient lip is designed, after having being pressed into the groove, to mask within the groove a partial area of exclusively the first surface,
   laminating the second surface with the laminating element, wherein parts of the laminating element cover the mask as a result of the lamination,
   removing the parts of the laminating element which cover the mask.

Embodiments of the invention could have the advantage that a complex positioning of the mask on the first surface is omitted. Therefore, instead of positioning the mask accurately over the first surface, it is sufficient to place the resilient lip above the groove by means of the above-described method. Once the resilient lip has been pressed into the groove, both the resilient lip and also, connected to the resilient lip, the rest of the mask over the first surface are forcibly positioned and therefore automatically optimally placed.

A further advantage could lie in the fact that the force-transmission element of the laminating tool, which is used to press the mask into or onto the groove, is not damaged due to the resilient properties of the lip. Here, no hard materials therefore contact one another, but the unyielding force-transmission element can act on the resilient lip gently and introduce it into the groove. The longevity of a laminating tool used accordingly is thus considerably increased.

Due to the resilient properties of the lip, in the event of an unfavourable collision between the force-transmission element and lip, the lip would tend to suffer more damage than the force-transmission element or even the component arranged beneath the resilient lip.

In accordance with an embodiment of the invention, the parts of the laminating element located above the mask are removed by guiding a blade in the groove. Embodiments of the invention could prevent damage to the used blade when the parts of the laminating element are removed. This is made possible in spite of prevailing tolerances of the used components. If, for example due to tolerances, the blade is guided too tightly along the resilient lip, the lip could thus yield without causing damage to the blade. If, instead, a hard mask were used, the risk of damaging the blade would be considerably increased.

In accordance with an embodiment of the invention, the resilient lip is arranged on a masking area of the mask, wherein the resilient lip and the masking area comprise a different material. This could enable cost-effective production of the mask, in particular if the material costs of the resilient lip are high. Here, a high-quality resilient material, such as a silicone or a rubber material, could be used for the resilient lip, whereas a much thinner and more cost-effective material could be used for the masking area. It is nevertheless ensured that damage to the mask when the parts of the laminating element covering the mask are removed is practically eliminated.

In accordance with an embodiment of the invention, the resilient lip has a mount for reversibly fastening the masking area to the resilient lip. The masking area can thus be exchanged relative to the resilient lip. This could also take account of the fact that a high-quality material could be used for the resilient lip, whereas a material of lower quality could be used for the masking area, in particular a much thinner material. This is because the masking area usually makes up the majority of the area to be masked, whereas the resilient lip is used exclusively in the region of the groove.

In accordance with an embodiment of the invention, the lip is designed, when pressed into the groove, not to contact the base of the groove or not to contact the base of the groove completely in the region of the first surface, which is located within the groove. Tolerances in the production of the component and in particular the groove thereof can therefore also be taken into account. In any case, it could be ensured that the resilient element dips optimally into the groove and covers there the first surface.

In accordance with an embodiment of the invention, the groove, as viewed in its direction of extension, has a bent course due to a bend of the groove, wherein the resilient lip has an incision at the edge of the bend. This incision is V-shaped for example. An individual straight cut could also be sufficient however. Further geometric shapes are also possible.

This could have the advantage that the resilient lip optimally masks the first surface, even in the region of the bend, in particular at the edge of the bend. As the resilient lip is pressed into the groove, the resilient lip does not buckle, such that an optimal covering and masking of the first surface is ensured even in the region of the folding of the laminating element over the edge of the groove.

In accordance with an embodiment of the invention, the laminating element is a laminating film, wherein, for the lamination, the laminating film is drawn over the component in a predetermined direction before the laminating film is connected in a laminating manner, wherein the resilient lip has a first texture with a first preferential direction, wherein the first preferential direction is parallel to the predetermined direction. This could enable optimised guidance of the laminating film by means of the texture in the direction of the first preferential direction. In addition, with use of a texture, the area that is in contact with the lip when the laminating film is drawn over could be minimised. For example, a plurality of elongate recesses arranged side by side in the direction of the first preferential direction could minimise the total area of contact of the laminating film on the resilient lip. The force thus necessary to draw over the laminating film is therefore reduced.

In accordance with an embodiment of the invention, the resilient lip on its portion located within the groove has a second texture having a second preferential direction, wherein the second preferential direction points in the direction of the base of the groove. This could also make it possible in particular to simplify a detachment of the laminating film from the parts covering the mask. If, for example, the laminating film were removed upwardly from the groove, the second texture thus prevents a tearing of the laminating film, in particular in a direction perpendicular to the second preferential direction. The laminating film located above the mask can thus be detached easily from the mask.

In accordance with an embodiment of the invention, the resilient lip is designed only when being pressed into the groove by the laminating tool to accurately adopt the shape in order to mask within the groove the partial area of exclusively the first surface. This simplifies the process of operating a corresponding laminating tool considerably, since any sort of placement and centring of the lip in the groove is unnecessary. At the moment when the force-transmission element of the laminating tool presses the resilient lip into the groove, the resilient lip and therefore the entire mask, as already described above, are independently aligned with the component.

The masking of the first surface with the mask could thus include an application of the mask to the first surface, wherein the resilient lip has a shape which, before the lip is pressed into the groove by the laminating tool, prevents the resilient lip from penetrating the groove.

In accordance with an embodiment of the invention, the resilient lip in its region to be pressed into the groove has a protrusion or a recess, wherein the protrusion or the recess is designed to support a complementary force-transmission element of the laminating tool for pressing the resilient lip into the groove. This could further contribute to transferring the resilient lip into the groove in a guided manner. The resilient lip is thus preferably guided directly into the groove by the complementary force-transmission element of the laminating tool.

In a further aspect, the invention relates to a mask for masking a component, wherein the component has a groove, wherein the component has a first surface and a second surface, wherein the first surface and the second surface border on one another in the groove, wherein the mask has a resilient lip, wherein the resilient lip is designed to be pressed into the groove by the laminating tool, wherein the resilient lip is designed, after having been pressed into the groove, to mask within the groove a partial area of exclusively the first surface.

In a further aspect, the invention relates to a laminating tool for laminating a component with a laminating element, wherein the component has a groove, wherein the component has a first surface and a second surface, wherein the first surface and the second surface border on one another in the groove, wherein the device comprises:
 means for pressing a resilient lip of an above-described mask into the groove by means of the laminating tool,
 means for laminating the second surface with the laminating element, wherein parts of the laminating element cover the mask due to the lamination.

It is noted that the above-described embodiments of the invention can be combined with one another arbitrarily, provided the combined embodiments are not mutually exclusive.

BRIEF DESCRIPTION OF THE DRAWINGS

Preferred embodiments of the invention will be explained in greater detail hereinafter with reference to the drawings, in which.

DETAILED DESCRIPTION OF THE INVENTION

Elements similar to one another will be denoted hereinafter by like reference signs.

Figure 1:
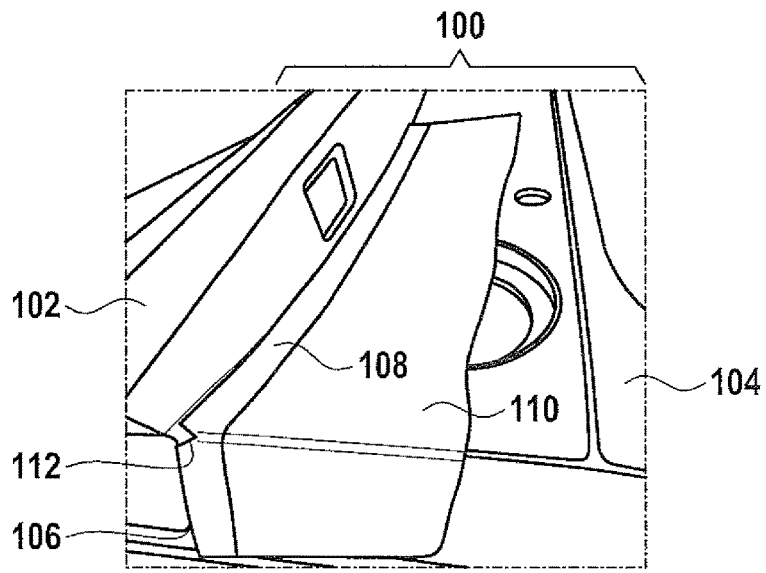
FIG. 1 shows a view of a component with mask.

FIG. 1 shows a view of a component 100 which is to be laminated. Here, this component is a motor vehicle interior trim part, for example. The present description is not limited however to motor vehicle interior trim parts, but includes all types of trim parts, in particular also for aircraft and rail vehicles.

The component 100 has a first surface 104 and a second surface 102. These two surfaces are separated from one another by a groove 106. This is clear again in the cross-sectional view of FIG. 2. The objective is then to apply to the second surface a laminating element, for example a laminating film, without however also laminating the first surface 104 during this process.

To this end, the first surface 104 is masked by a mask, wherein the mask has a resilient lip 108 and a masking area 110 connected to the resilient lip 108.

As viewed in the direction of extension of the groove 106, that is to say from bottom left to top right in FIG. 1, the component 100 and therefore the groove in FIG. 1 has a bent course. In order to then ensure optimal masking of the first surface 104, even in the region of the edge of the bend, the resilient lip 108 has a V-shaped incision 112 at the edge of the bend.

Figure 2:
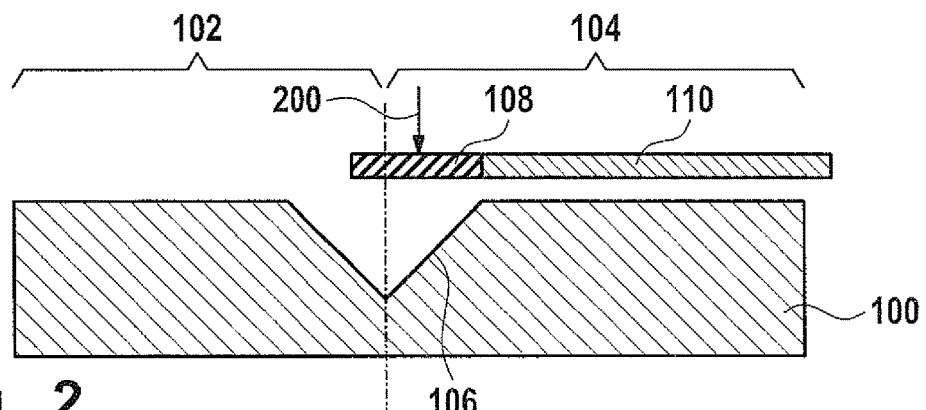
FIG. 2 shows a cross-sectional view of a component with groove and mask placed thereabove.

The shape of the resilient lip 108 is selected, as can be seen in FIG. 2, such that, before the lip 108 is pressed into the groove 106 by the laminating tool, the resilient lip 108 is prevented from infiltrating the groove 106. Only once the force has been applied in the direction 200 is the resilient element 108 bent over and thus introduced into the groove 106, whereby the mask self-positions itself with respect to the component 100. The result is shown in FIG. 3.

Figure 3:
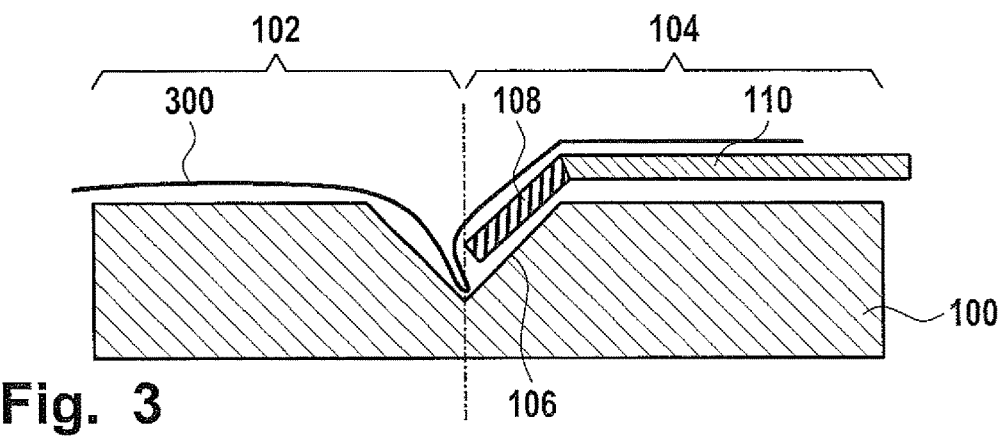
FIG. 3 shows a cross-sectional view of the component from FIG. 2 with laminating element.

FIG. 3 also shows that the resilient lip 108, once pressed into the groove 106, within the groove masks a partial area of exclusively the first surface 104. The second surface 102 is not masked by the resilient element 108.

Once the second surface 102 has been laminated with the laminating element, parts of the laminating element cover the mask, in particular the masking area 110. By guiding a blade 400 in the groove along the resilient element 108, the part of the laminating element 300 which covers the mask can now be separated.

Figure 4:
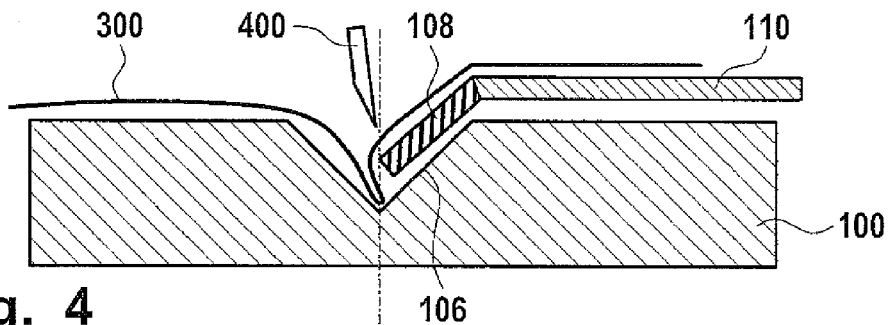
FIG. 4 shows a continuation of the view from FIG. 3 just before the removal of the parts of the laminating element which cover the mask.
Figure 5:
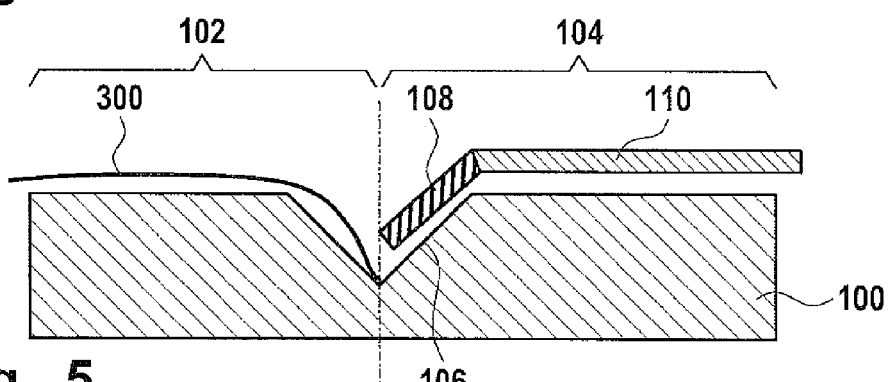
FIG. 5 shows a continuation of the view from FIG. 3 once parts of the laminating element have been removed.

The result of the removal of this part of the laminating element, which covered the mask previously in FIG. 4, is shown in FIG. 5. If the mask 108, 110 is now taken away from the component 100, the first surface 104 can be laminated with a further laminating element in a further laminating process. Here, known thermal laminating methods can be used, such as vacuum laminating methods and press laminating methods.

Figure 6:
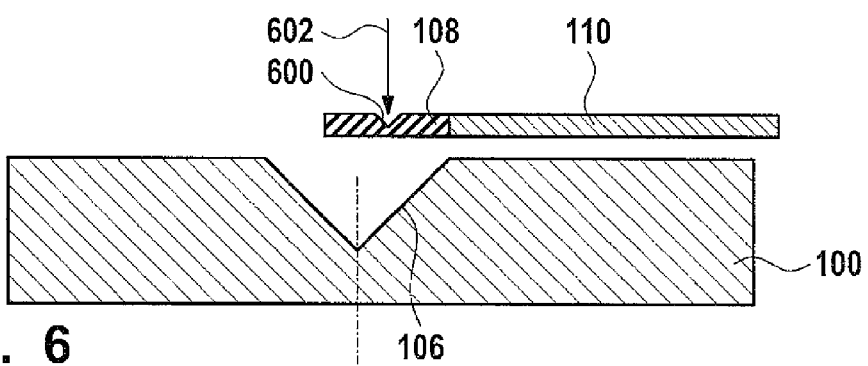
FIG. 6 shows a cross-sectional view of a component with groove and alternative mask.

FIG. 6 shows a variant of a resilient lip 108, which has a recess 600. This recess 600 may contribute to the fact that, when a complementary force-transmission element of the laminating tool is applied to the resilient lip 108 and in particular to the recess 600, a guided bending over and introduction of the resilient lip 108 into the groove 106 is made possible.

Figure 7:
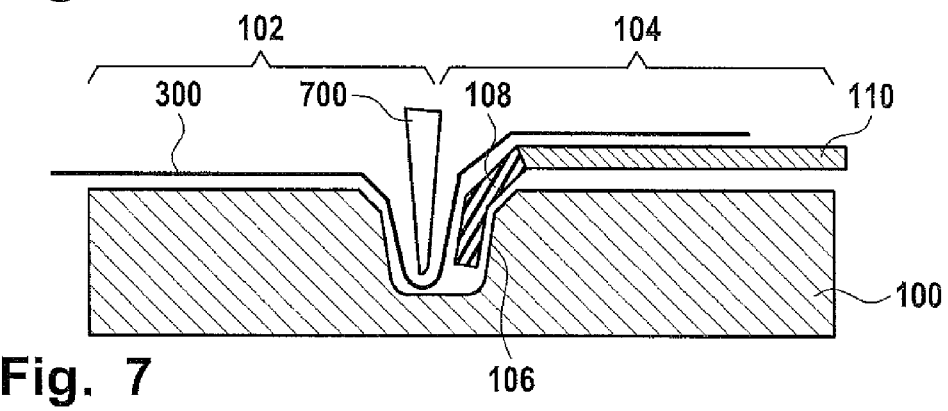
FIG. 7 shows a further cross-sectional view of the component from FIG. 2 with laminating element.

FIG. 7 shows how the laminating element 300 can be introduced within a narrow groove 106. If the vacuum is not sufficient to shape the laminating element (300) into the groove, a shaping aid 700 may be used. This presses the laminating element 300 into the groove 106 during the laminating process. The resilient lip 108 yields and is placed against the partial area of the groove 106 that is to be masked. There is no risk of collision since the resilient lip 108 can compress and deform.

LIST OF REFERENCE SIGNS

100 component
102 second surface
104 first surface
106 groove
108 resilient element
110 masking area
112 V-shaped incision
200 direction
300 laminating element
400 blade
600 recess
602 direction
700 shaping aid

The invention claimed is:

1. A method for laminating a component by means of a laminating tool with a laminating element, wherein the component has a groove, wherein the component has a first surface and a second surface, wherein the first surface and the second surface border on one another in the groove, wherein the method comprises the following steps:

masking the first surface with a mask removably positioned on the first surface, wherein the mask has a resilient lip, pressing the resilient lip into the groove by means of the laminating tool, wherein the resilient lip is designed, after having being pressed into the groove, to mask within the groove a partial area of exclusively the first surface, laminating the second surface with the laminating element, wherein, due to the lamination, parts of the laminating element cover the mask, removing the parts of the laminating element which cover the mask; and removing the mask from the first surface.

2. The method according to claim 1, wherein the parts of the laminating element located above the mask are removed by guiding a blade in the groove.

3. The method according to claim 1, wherein the resilient lip is arranged on a masking area of the mask, wherein the resilient lip and the masking area comprise a different material.

4. The method according to claim 3, wherein the coefficient of friction for the laminating element in the region of the resilient lip is lower than in the region of the masking area.

5. The method according to claim 3, wherein the resilient lip has a mount for reversibly fastening the masking area to the resilient lip.

6. The method according to claim 1, wherein the lip is designed, when pressed into the groove, not to contact the base of the groove or not to fully the contact the base of the groove in the region of the first surface located within the groove.

7. The method according to claim 1, wherein the groove, as viewed in its direction of extension, has a bent course due to a bend of the groove, wherein the resilient lip has an incision at the edge of the bend.

8. The method according to claim 7, wherein the incision is V-shaped.

9. The method according to claim 1, wherein the laminating element is a laminating film, wherein, for the lamination, the laminating film is drawn over the component in a predetermined direction before the laminating film is connected to the component in a laminating manner, wherein the resilient lip has a first texture with a first preferential direction, wherein the first preferential direction is parallel to the predetermined direction.

10. The method according to claim 1, wherein the resilient lip on its portion located within the groove has a second texture with a second preferential direction, wherein the second preferential direction points in the direction of the base of the groove.

11. The method according to claim 1, wherein the resilient lip is designed, only when pressed into the groove by the laminating tool, to accurately adopt a shape in order to mask within the groove the partial area of exclusively the first surface.

12. The method according to claim 1, wherein the masking of the first surface with the mask comprises an application of the mask to the first surface, wherein the resilient lip has a shape which, before the lip is pressed into the groove by the laminating tool, prevents the resilient lip from infiltrating the groove.

13. The method according to claim 1, wherein the resilient lip in its region to be pressed into the groove has a protrusion or a recess, wherein the protrusion or the recess is designed to support a complementary force-transmission element of the laminating tool for pressing the resilient lip into the groove.

* * * * *